(12) United States Patent
Song et al.

(10) Patent No.: US 10,209,463 B2
(45) Date of Patent: Feb. 19, 2019

(54) SILICON WAVEGUIDE COUPLING ALIGNMENT APPARATUS

(71) Applicant: Accelink Technologies Co., Ltd., Wuhan (CN)

(72) Inventors: Qionghui Song, Wuhan (CN); Jiecong Huang, Wuhan (CN); Jiuhong Ling, Wuhan (CN); Wei Du, Wuhan (CN); Weidong Ma, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 15/740,961

(22) PCT Filed: Dec. 15, 2015

(86) PCT No.: PCT/CN2015/097436
§ 371 (c)(1),
(2) Date: Dec. 29, 2017

(87) PCT Pub. No.: WO2017/000510
PCT Pub. Date: Jan. 5, 2017

(65) Prior Publication Data
US 2018/0196205 A1 Jul. 12, 2018

(30) Foreign Application Priority Data

Jun. 30, 2015 (CN) .......................... 2015 1 0386859

(51) Int. Cl.
*G02B 6/42* (2006.01)
*G02B 6/44* (2006.01)

(52) U.S. Cl.
CPC .............. *G02B 6/422* (2013.01); *G02B 6/42* (2013.01); *G02B 6/4405* (2013.01)

(58) Field of Classification Search
None
See application file for complete search history.

(56) References Cited

U.S. PATENT DOCUMENTS 4,500,165 A    2/1985   Scholl et al.

FOREIGN PATENT DOCUMENTS

| CN | 102520493 A | 6/2012 |
| CN | 103984063 A | 8/2014 |

(Continued)

OTHER PUBLICATIONS

Chinese Search Report for Application No. CN201510386859.5 dated Mar. 11, 2016.

(Continued)

*Primary Examiner* — Chad H Smith
(74) *Attorney, Agent, or Firm* — Lerner, David, Littenberg, Krumholz & Mentlik, LLP

(57) ABSTRACT

A silicon waveguide coupling alignment apparatus includes a fine adjustment bracket, a stress releasing clamp and a silicon photonic integrated chip force sensor. A silicon photonic integrated chip is fixed on the silicon photonic integrated chip force sensor, at least a part of an optical fiber to be coupled is fixed on one end of the stress releasing clamp, the stress releasing clamp is arranged on the fine adjustment bracket, an end surface of the optical fiber to be coupled is aligned with an end surface of the silicon photonic integrated chip by adjusting a position of the fine adjustment bracket, and a cushioning mechanism is arranged within the stress releasing clamp to cushion a collision force in a direction perpendicular to the end surface of the optical fiber to be coupled. The contact force imposed by the optical fiber on the end surface of the chip can be released by the clamp.

10 Claims, 3 Drawing Sheets

(56) References Cited

FOREIGN PATENT DOCUMENTS

| | | |
|---|---|---|
| CN | 104122633 | 10/2014 |
| CN | 104155730 A | 11/2014 |
| CN | 104932066 A | 9/2015 |
| JP | 2005316029 A | 11/2005 |

OTHER PUBLICATIONS

International Search Report for Application No. PCT/CN2015/097436 dated Feb. 25, 2016.

US 10,209,463 B2

SILICON WAVEGUIDE COUPLING ALIGNMENT APPARATUS

CROSS REFERENCE TO RELATED APPLICATIONS

The present application is a national phase entry under 35 U.S.C. § 371 of International Application No. PCT/CN2015/097436, filed Dec. 15, 2015, which claims priority from Chinese Patent Application No. 201510386859.5 filed Jun. 30, 2015, all of which are hereby incorporated herein by reference.

TECHNICAL FIELD

The present invention relates to an alignment apparatus for coupling an optical fiber with a silicon waveguide, and the present invention belongs to the field of communications.

BACKGROUND

Silicon-based (SOI) material is a new type of material for silicon-based integrated circuits and optoelectronic integrated circuits. This material is highly valued by major integrated circuit manufacturers in the world for its high integration, excellent high-frequency characteristic, low power consumption, good compatibility with existing large scale integrated circuit technologies, and it is also the most competitive integrated material in high-speed optical communication system at present. A variety of silicon-based photonic devices such as high-speed electro-optical modulators, photodetectors, and integrated chips have emerged and matured gradually.

The difference between the refractive index of silicon dioxide and that of a silicon waveguide made of the SOI material is large, which greatly enhances the limiting effect of a waveguide layer on light and may reduce the size of the waveguide to the micron order or less, enabling an unparalleled advantage for the SOI material in integration. However, the fiber core of an optical fiber is mainly made of silicon dioxide, and such mismatch between the refractive index of silicon dioxide and that of the SOI material waveguide will directly lead to a relatively great optical loss in coupling alignment between the optical fiber and the silicon waveguide.

In order to solve the problem of great coupling loss, a variety of mode field conversion structures for increasing the mode field diameter of the silicon waveguide have emerged, mainly including a forward wedge mode field conversion structure, a reverse wedge mode field conversion structure, a prism coupler, a grating coupler, and so on. The reverse wedge mode field conversion structure is applied in the field of integrated optical devices due to its advantages of high coupling efficiency, large alignment tolerance, easy integration, and so on. Using this structure, the size of the silicon waveguide is reduced, so that the limiting effect on the mode field is decreased in center of the waveguide and a large amount of mode field leaks into a chip cladding which has a refractive index similar to that of the fiber core, thereby the matching with the refractive index of the fiber core is obtained. In order to prevent great loss of the optical power caused by the mold field re-entering a silicon substrate layer through the under-cladding of the chip, the silicon around the cladding used as the mode field conversion structure is usually etched away. FIG. 1 and FIG. 2 are structural schematic diagrams of two suspended waveguides 1. Such suspended waveguide has a cross-section diameter of only several microns, thus it is very fragile and cannot withstand a relatively high stress. During the coupling alignment with an optical fiber, as shown in FIG. 3, the spacing between the optical fiber and the waveguide is set to be very small in order to obtain a relatively small coupling loss. A high impacting contact force will be easily produced between the fiber and the waveguide due to a slight carelessness, which will cause the damage of the suspended waveguide.

SUMMARY

The technical problem to be solved in the present invention is to overcome the existing defects in the prior art and to provide a silicon waveguide coupling alignment apparatus for realizing coupling alignment of a suspended silicon waveguide, and the apparatus can prevent the suspended waveguide from being damaged due to collision with an optical fiber.

A technical solution adopted by the present invention is as follows.

A silicon waveguide coupling alignment apparatus, comprising a fine adjustment bracket, a stress releasing clamp, and a silicon photonic integrated chip force sensor, wherein a silicon photonic integrated chip is fixed on the silicon photonic integrated chip force sensor, at least a part of an optical fiber to be coupled is fixed on one end of the stress releasing clamp, the stress releasing clamp is arranged on the fine adjustment bracket, an end surface of the optical fiber to be coupled is aligned with an end surface of the silicon photonic integrated chip by adjusting a position of the fine adjustment bracket, and a cushioning mechanism is arranged within the stress releasing clamp to cushion a collision force in a direction perpendicular to the end surface of the optical fiber to be coupled.

The cushioning mechanism arranged within the stress releasing clamp is a spring.

An elastic coefficient K of the spring is 1~2 g/mm.

The silicon photonic integrated chip force sensor is an axial stress sensor which is only sensitive to a force in a direction perpendicular to a direction of the end surface of the silicon photonic integrated chip.

The stress releasing clamp is an axial stress releasing clamp.

The stress releasing clamp is a steering stress releasing clamp.

The axial stress releasing clamp comprises a fixing base, a positioning bolt, a guide block, a scale, an optical fiber positioning slider, an optical fiber pressing block, and the spring, wherein the fixing base is used to support the axial stress releasing clamp and fix the clamp onto the fine adjustment bracket, the guide block is fixed on the fixing base, a sliding groove is arranged on the guide block and the spring is installed within the sliding groove, the optical fiber positioning slider includes a platform and two cylinders of different diameters located on one side of the platform, the bigger cylinder of the optical fiber positioning slider has a diameter larger than an outer diameter of the spring and the smaller cylinder of the optical fiber positioning slider extends through a through hole in the middle of the spring, the bigger cylinder is in contact with one end of the spring and the other end of the spring is located by contacting with the positioning bolt, the positioning bolt is used to adjust an initial position of the spring, the optical fiber positioning slider is able to be moved along a sliding groove of the fixing base under a force, a V-groove is arranged on the optical fiber positioning slider, and the optical fiber to be coupled is fixed within the V-groove of the optical fiber positioning slider by the optical fiber pressing block.

A surface of the optical fiber positioning slider in contact with the fixing base is made of Teflon material to reduce a friction force between contact surfaces of the optical fiber positioning slider and the fixing base.

The steering stress releasing clamp comprises a baseplate, a positioning plate, a rotary rod, a device fixing groove, a rotating shaft, and the spring, wherein the baseplate is used to support the steering stress releasing clamp and fix the clamp onto the fine adjustment bracket, the rotating shaft is arranged on the rotary rod, the rotary rod is fixed on the baseplate through the rotating shaft, one side of a left end or a right end of the rotary rod is in contact with one end of the positioning plate and the spring is mounted between the other side of the left end or the right end of the rotary rod and the other end of the positioning plate, and the device fixing groove is provided at one end of the rotary rod to fix the coupled optical device having the optical fiber to be coupled.

A positioning structure is arranged on the side of the rotary rod in contact with the spring to define a movement direction of the spring.

The advantages of the present invention are as follows.

1) The optical fiber end clamp of the apparatus according to the present invention has a stress releasing effect, and the contact force imposed by the optical fiber on the end surface of the chip can be easily released by the clamp, thereby guaranteeing that damages to the end surface of the chip due to a high impacting force of the optical fiber are avoided.

2) The apparatus according to the present invention can effectively avoid the influence of the friction force of the device at the optical fiber end itself on the contact force of the optical fiber.

| | |
|---|---|
| 1: suspended waveguide | 2: optical fiber |
| 3: silicon photonic integrated chip | 4: sensor |
| 5: fine adjustment bracket | 6: axial stress releasing clamp |
| 6-1: fixing base | 6-2: positioning bolt |
| 6-3: guide block | 6-4: scale |
| 6-5: optical fiber positioning slider | 6-6: optical fiber pressing block |
| 7: spring | 8: coupled optical device |
| 9: steering stress releasing clamp | 9-1: baseplate |
| 9-2: positioning plate | 9-3: rotary rod |
| 9-4: device fixing groove | 10: rotating shaft |

DESCRIPTION OF EMBODIMENT

The present invention will be described below in detail with reference to the embodiments and the drawings.

Figure 1:
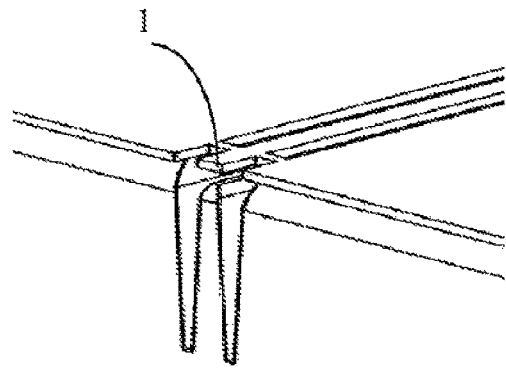
FIG. 1 is a structural schematic diagram of a suspended waveguide according to the prior art.
Figure 2:
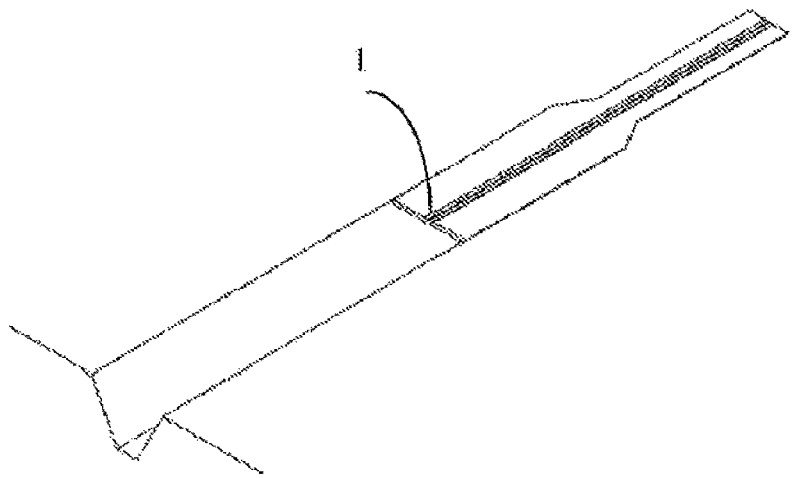
FIG. 2 is a structural schematic diagram of a suspended waveguide having an alignment V-groove according to the prior art.
Figure 3:
FIG. 3 is a schematic diagram of a coupling between an end surface of an optical fiber and a waveguide according to the prior art.
Figure 4:
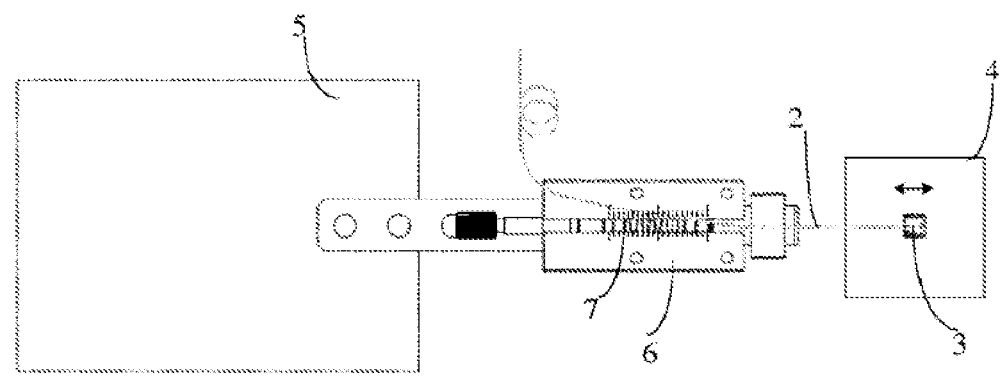
FIG. 4 is a structural schematic diagram of a coupling platform according to the present invention.

FIG. 4 is a structural schematic diagram of a coupling platform for controlling a stress on a coupling end surface according to the present invention, which includes a sensor 4, a fine adjustment bracket 5, and an axial stress releasing clamp 6. One end of the axial stress releasing clamp 6 is fixed on the fine adjustment bracket 5, and the other end of the axial stress releasing clamp 6 is fixed with an optical fiber 2 to be coupled, and a silicon photonic integrated chip 3 is fixed on the sensor 4. The sensor 4 is an axial stress sensor, which is only sensitive to a force in the direction of contact between the optical fiber 2 and the end surface of the silicon photonic integrated chip, for example, in the direction of the arrow shown above the sensor 4.

Figure 5:
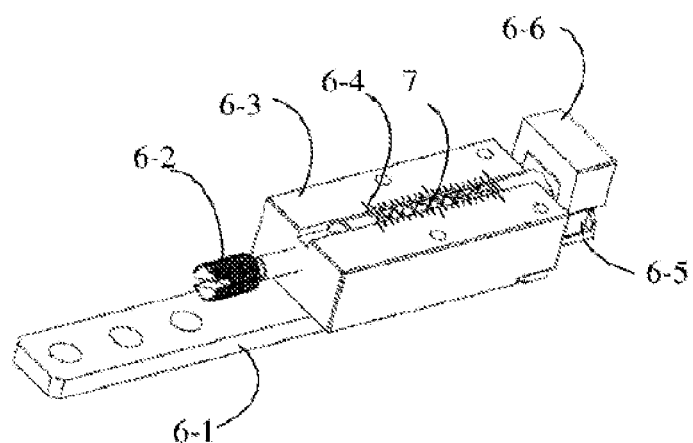
FIG. 5 is a structural schematic diagram of an axial stress releasing clamp according to the present invention.
Figure 6:
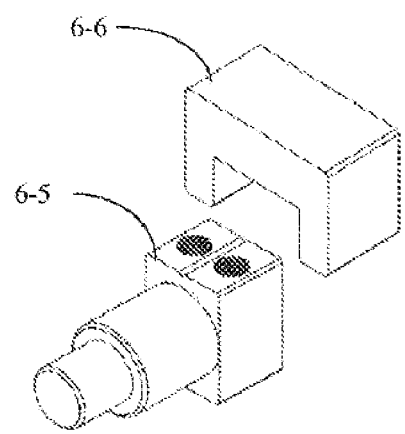
FIG. 6 is a schematic diagram of an optical fiber fixing portion according to the present invention.

FIG. 5 is a structural schematic diagram of an axial stress releasing clamp 6, which includes a fixing base 6-1, a positioning bolt 6-2, a guide block 6-3, a scale 6-4, an optical fiber positioning slider 6-5, an optical fiber pressing block 6-6, and a spring 7. The fixing base 6-1 is used to support the whole clamp and fix the clamp onto the fine adjustment bracket 5, and the guide block 6-3 is fixed on the fixing base 6-1. A sliding groove is arranged on the guide block 6-3 and a compression spring 7 is installed within the sliding groove. The left end of the spring 7 is in contact with the positioning bolt 6-2, and the right end of the spring 7 is in contact with the optical fiber positioning slider 6-5. The optical fiber positioning slider 6-5 includes a platform and two cylinders of different diameters located on one side of the platform. As shown in FIG. 6, the smaller cylinder is used to extend through a through hole in the middle of the spring 7 to prevent the spring from falling off. The bigger cylinder has a diameter larger than the outer diameter of the spring, it is in contact with the spring 7 and partially extends through the guide block 6-3, and it plays a guiding role when the optical fiber positioning slider 6-5 is moved by the force. The optical fiber positioning slider 6-5 is located on the fixing base 6-1 and may be horizontally moved along the direction of the fixing base 6-1 under the force. In order to make the sliding direction of the optical fiber positioning slider 6-5 be the axial direction, the height of two side walls of the fixing base 6-1 may be increased, or mutually matched concave-convex sliding groove structures may be adopted between the optical fiber positioning slider 6-5 and the fixing base 6-1. A V-groove is arranged on the optical fiber positioning slider 6-5, and the optical fiber 2 is fixed within the V-groove between the optical fiber positioning slider 6-5 and the optical fiber pressing block 6-6, as shown in FIG. 6. The initial position of the spring 7 can be adjusted by rotationally adjusting the position of the positioning bolt 6-2, and the initial position and length of the spring may be recorded by scale lines of the scale 6-4.

With reference to FIG. 4 and FIG. 5, the application and principle of the axial stress releasing clamp will be described as follows.

Before being coupled with the chip, the optical fiber is fixed between the optical fiber positioning slider 6-5 and the optical fiber pressing block 6-6, the position of the positioning bolt 6-2 is adjusted to move the spring 7 to the initial position, and the initial position and length of the spring are recorded. During the coupling alignment, by adjusting the fine adjustment bracket 5, coupling alignment between the optical fiber and the chip waveguide can be obtained and the index optimization can be achieved.

In the coupling process, the end surface of the optical fiber is easily collided with the chip waveguide. At this time, although the sensor 4 can sense and feedback the force condition on the end surface of the chip, the adjusting process is required to be very careful. If the fine adjustment bracket is moved too fast and thus the impact velocity is too high, it is very likely that the chip has already been damaged when the sensor 4 provides feedback. Therefore, in the present invention, a spring structure for releasing stress is arranged at one end of the optical fiber clamp. The force received on the end surface of the chip is quickly transferred to the optical fiber positioning slider 6-5 via the optical fiber 2, and since the guide block 6-3 cannot be moved, the optical fiber positioning slide 6-5 slides along the fixing base 6-1 and compresses the spring 7 under the force, so that the stress is rapidly decreased by the compression of the spring 7 to a strength range that the chip waveguide may withstand. At this time, the maximum force F received on the end surface of the chip is:

$$F = f + Kx$$

wherein f is a sliding/static friction force experienced by the optical fiber positioning slider 6-5 along the surface of the fixing base 6-1 under the force, K is an elastic coefficient of the spring, and x is a compression length of the spring. The surface of the optical fiber positioning slider 6-5 in contact with the fixing base 6-1 may be made of a material having a small friction coefficient such as Teflon to reduce the sliding/static friction force f. A spring having a small elastic coefficient K, such as 1~2 g/mm, may be used to reduce the spring force Kx. Thereby, the force F received on the end face can be controlled within a very small range, so that damage to the chip waveguide can be avoided.

When the coupled optical fiber belongs to an optical device, if the optical device is fixed on the optical fiber positioning slider 6-5, the overall weight of the optical fiber positioning slider 6-5 will be increased and thus the friction force f will be increased. In this case, the present invention may adopt a rotating shaft and lever structure to avoid the influence of the friction force f.

Figure 7:
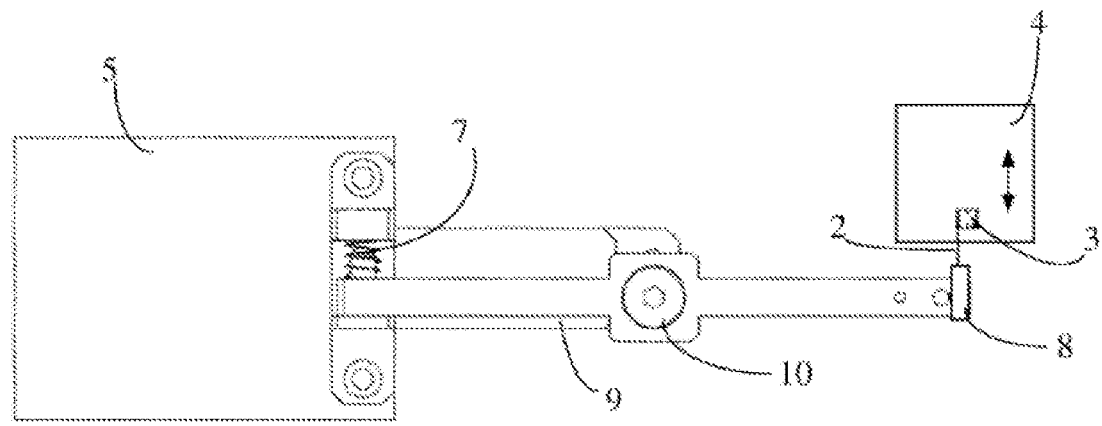
FIG. 7 is a structural schematic diagram of another coupling platform according to the present invention.
Figure 8:
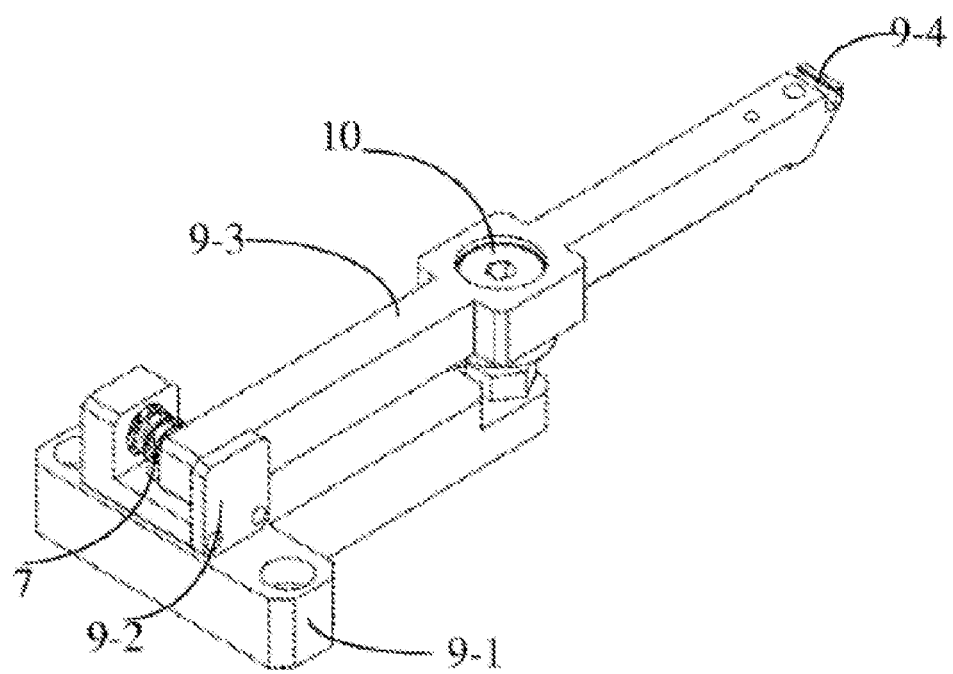
FIG. 8 is a structural schematic diagram of a steering stress releasing clamp according to the present invention.

FIG. 7 is a structural schematic diagram of another coupling platform for controlling a stress on a coupling end surface according to the present invention, which includes a sensor 4, a fine adjustment bracket 5, and a steering stress releasing clamp 9. One end of the steering stress releasing clamp 9 is fixed on the fine adjustment bracket 5, and the other end of the steering stress releasing clamp 9 is fixed with a coupled optical device 8 having an optical fiber, and a silicon photonic integrated chip 3 is fixed on the sensor 4. The sensor 4 is an axial stress sensor, and its force-sensitive direction is for example the direction of the arrow shown above the sensor 4. FIG. 8 is a structural schematic diagram of a steering stress releasing clamp 9, which includes a baseplate 9-1, a positioning plate 9-2, a rotary rod 9-3, a device fixing groove 9-4, a rotating shaft 10, and a spring 7. The baseplate 9-1 is used to support the whole clamp and fix the clamp onto the fine adjustment bracket 5. The rotary rod 9-3 extends to the area of the positioning plate 9-2 and is provided with the rotating shaft 10, through which the rotary rod 9-3 is fixed on the baseplate 9-1. One side of the left end of the rotary rod 9-3 is in contact with one end of the positioning plate 9-2, and the spring 7 is installed between the other side of the left end of the rotary rod 9-3 and the other end of the positioning plate 9-2. In order to ensure the stable installation of the spring 7, a positioning cylindrical structure is arranged on the side of the rotary rod 9-3 equipped with the spring, and a positioning hole is arranged on the side of the positioning plate 9-2 equipped with the spring. One end of the spring 7 is in contact with the rotary rod 9-3 through the positioning cylinder, and the other end of the spring 7 is in contact with the positioning plate 9-2 through the positioning hole on the positioning plate 9-2. The right end of the rotary rod 9-3 is provided with the device fixing groove 9-4 for fixing the coupled optical device 8. In this embodiment, the spring 7 may also be installed between the other side of the right end of the rotary rod 9-3 and the other end of the positioning plate 9-2, and the other components may be adjusted accordingly. Therefore, the rotary rod 9-3 can be pushed back under the force and rotate around the rotating shaft 10 to compress the spring 7.

With reference to FIG. 7 and FIG. 8, the application and principle of the steering stress releasing clamp according to the present invention will be described as follows.

When the end face of the optical fiber collides with the chip waveguide, the stress received on the end surface of the chip is quickly transferred to the right end of the rotary rod 9-3 through the optical fiber 2 and the coupled optical device 8. The rotary rod 9-3 moves back under the force, rotates around the rotating shaft 10 and compresses spring 7. By adopting the structure of the rotating shaft, the influence of the friction force on the force received on the end surface of the chip may be greatly reduced. By adjusting the position of the rotating shaft 10 on the rotary rod 9-3 and utilizing the lever principle, the sensitivity of the rotary rod 9-3 to the stress may be greatly increased. Therefore, by pushing back the rotary rod, the force experienced by the chip is rapidly decreased to a strength range that the chip waveguide may withstand. In this embodiment, the movable component of the stress releasing clamp reduces the friction force, and the rotating shaft and the lever structure are adopted so that the friction force is reduced by the rolling friction and the sensitivity of the clamp to the stress is increased by the lever structure, therefore the force experienced by the chip is rapidly decreased to the strength range that the chip waveguide may withstand.

In the present invention, the spring is adopted as an embodiment of the cushioning mechanism. Other embodiments of the cushioning mechanism may also be used in the present invention. The cushioning mechanism is not limited to the spring, but may also be other high-flexibility and high-tenacity materials with the same function, such as highly elastic rubber-like material.

Although the present invention has been illustrated and described in detail by reference to some specific embodiments, it will be apparent to those skilled in the art that upon reading and understanding this specification and the drawings thereof, various changes may be made in the structure and production details of the coupling alignment apparatus without departing from the spirit and scope of the present invention. Such changes will fall within the scope of protection as claimed in the claims of the present invention.

The invention claimed is:

1. A silicon waveguide coupling alignment apparatus, comprising a fine adjustment bracket, a stress releasing clamp, and a silicon photonic integrated chip force sensor, wherein a silicon photonic integrated chip is fixed on the silicon photonic integrated chip force sensor, at least a part of an optical fiber to be coupled is fixed on one end of the stress releasing clamp, the stress releasing clamp is arranged on the fine adjustment bracket, an end surface of the optical fiber to be coupled is aligned with an end surface of the silicon photonic integrated chip by adjusting a position of the fine adjustment bracket, and a cushioning mechanism is arranged within the stress releasing clamp to cushion a collision force in a direction perpendicular to the end surface of the optical fiber to be coupled.

2. The silicon waveguide coupling alignment apparatus according to claim 1, wherein the cushioning mechanism arranged within the stress releasing clamp is a spring.

3. The silicon waveguide coupling alignment apparatus according to claim 2, wherein an elastic coefficient K of the spring is 1~2 g/mm.

4. The silicon waveguide coupling alignment apparatus according to claim 1, wherein the silicon photonic integrated chip force sensor is an axial stress sensor which is only sensitive to a force in a direction perpendicular to a direction of the end surface of the silicon photonic integrated chip.

5. The silicon waveguide coupling alignment apparatus according to claim 2, wherein the stress releasing clamp is an axial stress releasing clamp.

6. The silicon waveguide coupling alignment apparatus according to claim 2, wherein the stress releasing clamp is a steering stress releasing clamp.

7. The silicon waveguide coupling alignment apparatus according to claim 5, wherein the axial stress releasing clamp comprises a fixing base, a positioning bolt, a guide block, a scale, an optical fiber positioning slider, an optical fiber pressing block, and the spring, wherein the fixing base is used to support the axial stress releasing clamp and fix the clamp onto the fine adjustment bracket, the guide block is fixed on the fixing base, a sliding groove is arranged on the guide block and the spring is installed within the sliding groove, the optical fiber positioning slider includes a platform and two cylinders of different diameters located on one side of the platform, the bigger cylinder of the optical fiber positioning slider has a diameter larger than an outer diameter of the spring and the smaller cylinder of the optical fiber positioning slider extends through a through hole in the middle of the spring, the bigger cylinder is in contact with one end of the spring and the other end of the spring is located by contacting with the positioning bolt, the positioning bolt is used to adjust an initial position of the spring, the optical fiber positioning slider is able to be moved along a sliding groove of the fixing base under a force, a V-groove is arranged on the optical fiber positioning slider, and the optical fiber to be coupled is fixed within the V-groove of the optical fiber positioning slider by the optical fiber pressing block.

8. The silicon waveguide coupling alignment apparatus according to claim 7, wherein a surface of the optical fiber positioning slider in contact with the fixing base is made of Teflon material to reduce a friction force between contact surfaces of the optical fiber positioning slider and the fixing base.

9. The silicon waveguide coupling alignment apparatus according to claim 6, wherein the steering stress releasing clamp comprises a baseplate, a positioning plate, a rotary rod, a device fixing groove, a rotating shaft, and the spring, wherein the baseplate is used to support the steering stress releasing clamp and fix the clamp onto the fine adjustment bracket, the rotating shaft is arranged on the rotary rod, the rotary rod is fixed on the baseplate through the rotating shaft, one side of a left end or a right end of the rotary rod is in contact with one end of the positioning plate and the spring is mounted between the other side of the rotary rod and the other end of the positioning plate, and the device fixing groove is provided at one end of the rotary rod to fix the coupled optical device having the optical fiber to be coupled.

10. The silicon waveguide coupling alignment apparatus according to claim 9, wherein a positioning structure is arranged on the side of the rotary rod in contact with the spring to define a movement direction of the spring.

* * * * *